June 14, 1932.  W. NANFELDT  1,862,760
FRICTION FABRIC AND METHOD OF MAKING THE SAME
Filed Oct. 30, 1928
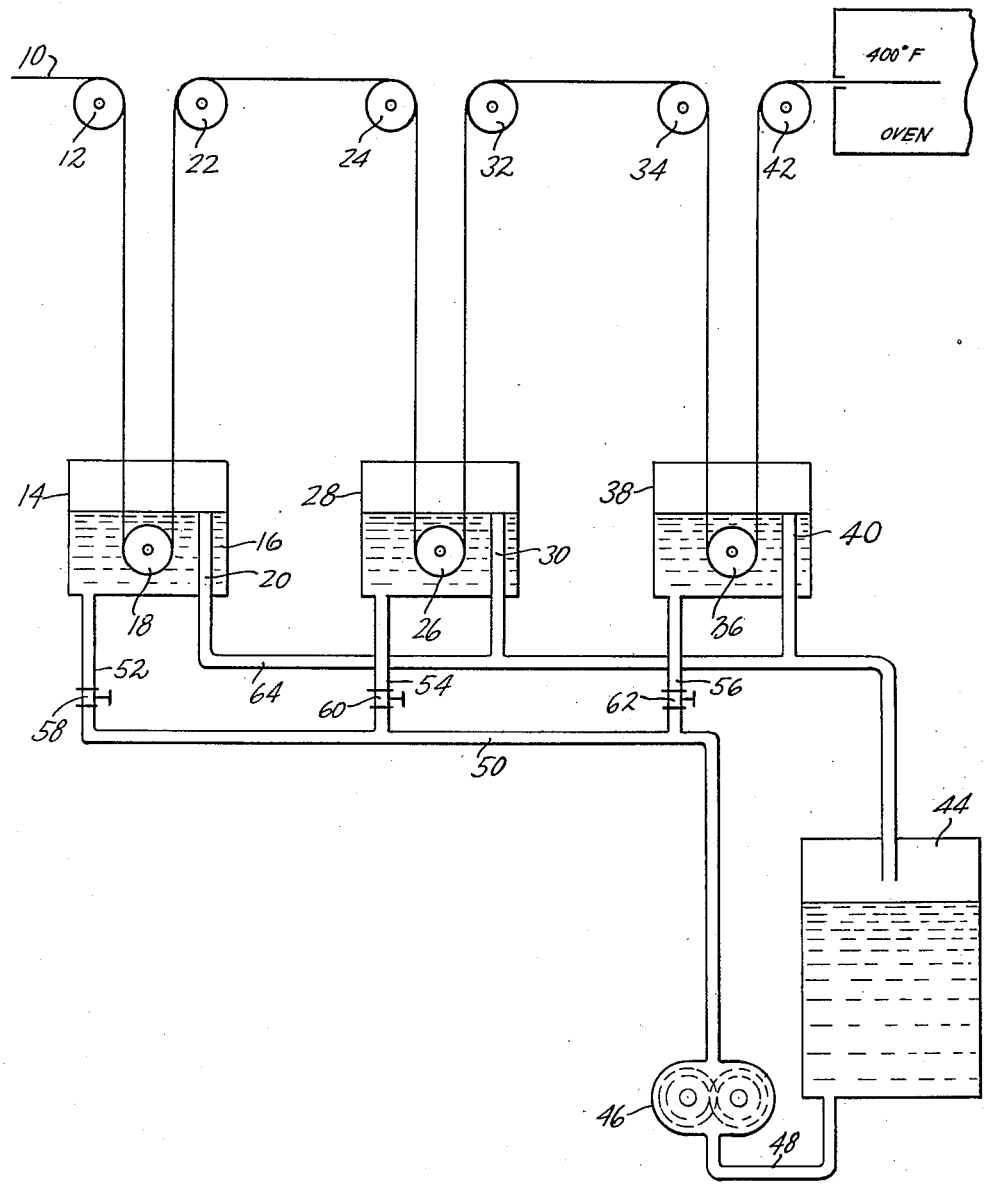
INVENTOR
WILLIAM NANFELDT
BY
Chester N Braselton
ATTORNEY Patented June 14, 1932                                                              1,862,760

UNITED STATES PATENT OFFICE

WILLIAM NANFELDT, OF PATERSON, NEW JERSEY, ASSIGNOR TO WORLD BESTOS CORPORATION, OF PATERSON, NEW JERSEY, A CORPORATION OF DELAWARE

FRICTION FABRIC AND METHOD OF MAKING THE SAME

Application filed October 30, 1928. Serial No. 316,062.

This invention relates to a friction fabric treated in a manner to develop certain highly advantageous novel properties therein, and to a method of making the friction fabric.

In connection with the making of brake linings and other friction fabrics many attempts have been made and experiments carried out to obtain a product having a plurality of desired properties. It has been found and generally recognized, that when a brake lining is designed to have certain desired properties, these properties appear to be in opposition to each other and certain properties or characteristics become modified or diminished because of the presence of certain materials or ingredients incorporated to produce the characteristics desired. In connection with the manufacture of brake linings, for example, it has been found that when material is added so as to produce a lining which is substantially unaffected by moisture, other properties or characteristics will be reduced or altered and the results obtained have not been satisfactory. It has been a general practice to produce a brake lining having the desired coefficient of friction for ordinary temperatures and certain linings have been made so as to have the coefficient of friction substantially unaltered by the presence of moisture. Such linings, however, have been found to wear rapidly, and a marked change in coefficient of friction takes place with wear, being gradually reduced as the wear increases; and furthermore, under high temperatures the coefficient of friction has been found to suddenly drop off producing a dangerous condition when the brakes are employed, after the temperature has been increased through continuous or frequent use of the brakes.

Other brake linings have been made in which the coefficient of friction under the usual operating conditions is satisfactory and in which the life of the lining is above the average, but when moisture comes in contact with the lining, as during a rain for example, the coefficient of friction becomes so low that it is substantially impossible to stop the car under normal traffic conditions.

One object of the present invention is to provide a friction fabric material having diversified properties which do not eliminate or modify each other.

Another object of my invention is to provide a brake lining in which the coefficient of friction will not be substantially changed by adhering moisture; which has a long life with a substantially constant coefficient of friction; which has a high frictional value on starting, and other desired properties not annulled or substantially modified by the incorporation of ingredients to produce these effects.

Another object of my invention is to provide a friction fabric in which the coefficient of friction will not be reduced under high heat and which has a high coefficient of friction at high speeds.

Another object of my invention is to provide a friction fabric which is particularly adapted for brake linings operated upon a metal drum to produce a braking action which will maintain a uniform coefficient of friction with changes in temperature and which is adapted to withstand moisture and oil without substantial change in the coefficient of friction between the lining and metal drum upon which it operates.

Another object of my invention is to provide a friction fabric which is adapted for a variety of uses and which will withstand wear to a high degree, and which may be made at a low production cost.

Another object of the invention is to provide a method for the making of friction fabrics which will maintain a uniform coefficient of friction with changes in temperature, through the operation of ingredients in the fabric material to produce a counter balancing effect upon each other and thereby maintaining substantially uniform conditions during the use of the fabric. The opposing actions produced in the use of the friction fabric comprise the formation of a glaze by one constituent incorporated into the lining, and the breaking up or reduction of the glaze by pulverization brought about by another constituent of the fabric.

Another object of the invention is to provide a brake-lining having a coefficient of friction which increases slightly with speed, the action of the lining being different from the ordinary brake linings in which the coefficient of friction decreases with increase of speed. With these and other objects in view, the invention comprises various features hereinafter more fully described and particularly defined in the claims.

It frequently occurs in connection with the use of clutch facings, for example, that while the clutch is effective for all loads at normal temperatures, the facing heats up with frequent or constant use and finally at a critical temperature, is modified so that a sudden drop takes place in the coefficient of friction of the material, as may occur, for example, where rubber is a component of the composition, which at high temperatures distills or is evolved from the friction fabric material and becomes coated on the surface of the facing. The friction fabric which I have discovered contains no ingredient which will be distilled in this manner at high temperatures to produce a reduction in the coefficient of friction.

My invention is based upon the discovery that the glazing effect produced in a friction fabric or lining by an ingredient or material incorporated therein may be counteracted or counterbalanced by an ingredient acting in opposition to the glaze to produce a dust which attacks and breaks down the glaze, thus limiting the glazing action to an amount producing a substantially constant coefficient of friction, which will remain substantially constant. The glazing action is, I believe, produced by the formation of a series of minute glazed surfaces or particles from the continuous glaze on the facing, resulting thus in a uniform coefficient of friction.

I have discovered in connection with friction facing material that certain desirable properties are obtained by producing a glazed surface, which however, is advantageous only to a certain point and that beyond this point the glazing action results in a slipping or non-holding brake, or produces, in other words, a sudden reduction in the coefficient of friction of the facing material. I have found furthermore, that by the incorporation of a certain ingredient or ingredients having a counterbalancing action into the brake lining, it may be made to retain the desired characteristics produced by glazing action, even with increased wear, by bringing about an opposing action or condition to limit the glaze formation. The added material apparently acts to prevent the collecting of any ingredient bringing about a change in conditions producing marked change in the properties of the lining or friction fabric.

The accompanying drawing illustrates a method for carrying on the impregnation of a friction fabric by which uniform impregnation may be obtained.

The preferred method of carrying out my invention comprises forming a mixture which when combined with a fabric in the manner hereinafter described yields the desired characteristics or properties. The materials which I preferably incorporate include water gas tar, coal tar, gilsonite, stearin pitch, linseed oil, China-wood oil, a drier and a coal tar solvent. These materials are preferably employed in the following proportions:

|  | Ounces |
|---|---|
| Water gas tar | 48 |
| Coal tar | 8 |
| Gilsonite | 6 |
| Stearin pitch | 6 |
| Linseed oil | 2 |
| China-wood oil | 1 |

Cobalt drier__ 5% of the linseed and China-wood oil

Coal tar solvent about one-third by weight of the total mixture

In this composition the water gas tar, which contains oil but no free carbon, gives a body to the mixture and serves also as a coloring material for the lining. It serves also as a vehicle for carrying the other components of the above composition into the fabric and assists in forming or serves to form a glaze by the breaking down into carbon at elevated temperatures.

The coal tar employed in the mixture serves at high temperatures to form a resinous gum or oil which acts to control the amount of friction at the start-off, or, in other words, at the time when the brake is first applied. This material is saturated with free carbon whereby the greater the amount of this material employed in the friction fabric, the lower will be the coefficient of friction, for the reason that the carbon therein acts as a lubricator.

The gilsonite which is employed acts as a frictioning agent and stands high temperatures fairly well but with extreme temperature breaks down to a gum or gummy material serving to increase the friction with high speeds.

The stearin pitch in the above composition is used because of its gummy nature and operates in the friction fabric to initiate the braking action or to start the brake to work. This material tends to filter onto the face of the lining being a poor penetrator, and serves to leave a heavy coating thereon forming a layer which serves to keep the glaze broken up into a dust.

The linseed oil gives increased body to the lining and serves as a vehicle to hold other materials therein, and to evenly distribute the impregnator constituents through the lining.

The China-wood oil which I employ serves as a hardening medium producing a hard body or film, giving backbone to the lining. This material is a drying oil and hardens through polymerization which is apparently accelerated by the presence of gilsonite in the mixture.

The cobalt drier in the above composition acts to assist in the oxidation of the linseed oil and may also assist in the drying and polymerization of the China-wood oil present.

The method which I preferably employ to impregnate the material into the friction fabric or brake lining comprises a treatment in three stages by which impregnation takes place first from one side and then from the other side of the material.

Referring more in detail to the drawing, the lining or fabric material 10 is first passed over a pulley 12 into a tank or container 14, containing a bath 16 of the mixture to be employed for impregnation, and is then passed over a pulley or drum 18 in the container 14 by which the fabric material is bent into an arc so as to open the pores on the expanded or outer side of the material, causing substantial impregnation from this side. An overflow pipe 20 is preferably employed in the tank 14 so as to maintain a uniform level of the liquid mixture therein.

After the material is passed over the pulley 18 in the tank 14, it is passed upwardly over a pulley 22, by which the belt 10 is bent in the opposite direction to that in which it was previously bent in passing over the pulley 18, which has a tendency to squeeze the impregnating material from the surface into the interior of the fabric. From the pulley 22 the fabric is passed over a pulley 24 and downwardly into a bath of the impregnating material in a tank 28, similar to the tank 14, to obtain further impregnation of the fabric. In this tank, in which the liquid level is maintained constant by means of an overflow pipe 30, the fabric passes over a pulley 26 being bent in the same direction as in passing over the pulley 18, by which further impregnation of the fabric through the opened pores takes place. From the pulley 26 the fabric passes over a pulley 32, then over a pulley 34, and from thence over a pulley 36 in the tank 38 in which a constant level of the impregnating liquid is maintained by an overflow pipe 40. Between the pulley 34 and the pulley 36 the fabric 10 is given a reversed twist, so that in passing over the pulley 36 the fabric is bent in the opposite direction from that in which it is bent in passing over the pulleys 18 and 26, thus opening the pores of the fabric on the opposite side from that which previously occurred by which complete impregnation from both sides of the fabric takes place. From the pulley 36 the fabric passes out of the tank and over a pulley 42, from which the fabric passes to a drying oven maintained at substantially 400° F. and from thence onto a calender to be pressed to size.

In order to obtain uniform conditions and homogeneity in the impregnating liquid it is preferably circulated from the tanks in the series into a common container 44, from which the liquid is pumped by means of a pump 46 through the pipe 48 and through the distributing pipe 50, which is connected to branch pipes 52, 54 and 56, connected respectively to the containers 14, 28 and 38. Valves 58, 60 and 62 are preferably employed in the pipes 52, 54 and 56 in order to control the flow of liquid into the respective tanks to which the pipes are connected. Liquid in passing from the overflow pipes 16, 30 and 40 passes to a common return pipe 64, connected to the container 44, whereby substantially uniform conditions are maintained when the liquid is pumped through the system.

It is to be understood that various changes may be made in the proportion of the constituents in the impregnating liquid without departing from the invention and that equivalent materials may be employed for each constituent as will be apparent to those skilled in the art without departing from the spirit or scope of the invention as defined in the claims. I may, for example, in place of the cobalt drier use any of the equivalent driers, such as manganese compounds, well known in the art. Further, I might employ either raw, boiled or blown linseed oil in the composition although I preferably employ ordinary boiled oil for this purpose.

Having thus described my invention, what I claim is:

1. A friction fabric comprising a fabric impregnated with a glaze-forming material and a glaze-destroying material in proportions so that as glazing action takes place in use of the frictioning material the glaze-destroying action or pulverizing action acts simultaneously to maintain a substantially constant coefficient of friction.

2. A friction fabric particularly adapted for brake linings which comprises a fabric impregnated with a glaze-forming composition and a powder-forming composition having glaze-destroying properties, thereby forming a frictioning surface composed of minute frictioning areas and providing a uniform constant coefficient of friction during use of the material.

3. A friction fabric particularly adapted for brake linings which comprises a fabric impregnated with a glaze-forming material and a glaze-destroying material in proportions such as to maintain a partially glazed surface which is prevented from forming and spreading to the extent of causing slipping and sufficient to provide a uniformly high coefficient of friction, the said fabric having also incorporated therein a material to maintain a uniform coefficient in the presence of water or moisture, a material to give a high coefficient of friction on starting, and a material to increase the coefficient of friction with increase of speed.

4. A friction lining comprising a friction fabric impregnated with a tar material as a glaze-forming agent to produce a glazed surface when the friction lining is in use, and with a dust-forming pitch in a relatively small proportion, serving as a glaze-destroying agent to limit glazing action and maintain a substantially constant coefficient of friction in the lining during use.

5. A friction fabric impregnated with water gas tar as a glaze-forming ingredient and with stearin pitch as a glaze-destroying ingredient, the latter material being in relatively small proportion, whereby, as glazing action occurs during use of the friction fabric, a limited glaze-destroying action takes place and prevents glazing action to the extent of causing slipping or sudden reduction in the coefficient of friction of the impregnated fabric.

6. A friction fabric comprising a friction fabric composition impregnated with a tar material as a glaze-forming agent to produce a glazed surface when the friction fabric is in use, and with a stearin pitch in a relatively small proportion serving as a glaze-destroying agent to limit glazing action and to maintain a substantially constant coefficient of friction in the fabric during use, together with polymerized China-wood oil serving to produce a hardening effect upon the lining.

7. A friction fabric comprising a fabric impregnated with a tar material as a glaze-forming agent to produce a glazed surface when the friction fabric is in use, and with a stearin pitch in a relatively small proportion, serving as a glaze-destroying agent to limit glazing action and to maintain a substantially constant coefficient of friction in the fabric during use, together with a suitable amount of coal tar to control the amount of friction in initiating braking action or clutch engagement.

8. A friction fabric comprising a fabric impregnated with a tar material as a glaze-forming agent to produce a glazed surface when the friction fabric is in use, and with a stearin pitch in a relatively small proportion serving as a glaze-destroying agent to limit glazing action and to maintain a substantially constant coefficient of friction in the fabric during use, together with a suitable amount of gilsonite to provide increased friction with high speeds during use of the fabric.

9. A friction fabric comprising a fabric impregnated with water gas tar as a glaze-forming material to produce a glazed surface when the friction fabric is in use, a coal tar to control the amount of friction in the start-off, a stearin pitch in a relatively small proportion serving as a glaze-destroying agent to limit glazing action and to maintain a substantially constant coefficient of friction in the fabric during use, together with polymerized China-wood oil serving to produce a hardening effect upon the lining.

10. A friction fabric comprising a fabric impregnated with water gas tar as a glaze-forming material producing a glazed surface when the friction fabric is in use, a coal tar to control the amount of friction at the start-off during use of the fabric, a stearin pitch in a relatively small proportion serving as a glaze-destroying agent to limit glazing action and to maintain a substantially constant coefficient of friction in the fabric during use, a polymerized China-wood oil serving to produce a hardening effect upon the lining and gilsonite to control the amount of friction in initiating braking or other frictioning action.

11. A friction fabric comprising a fabric impregnated with water gas tar as a glaze-forming material to produce a glazed surface when the friction fabric is in use, a coal tar to control the amount of friction at the start-off during use, a stearin pitch in a relatively small proportion serving as a glaze-destroying agent to limit glazing action and to maintain a substantially constant coefficient of friction in the fabric during use, and with gilsonite to control the amount of friction in initiating braking action.

12. A friction fabric comprising a fabric impregnated with water gas tar as a glaze-forming material to produce a glazed surface when the friction fabric is in use, a coal tar to control the amount of friction in the start-off, a stearin pitch in a relatively small proportion serving as a glaze-destroying agent to limit glazing action and to maintain a substantially constant coefficient of friction in the fabric during use, together with a polymerized China-wood oil serving to produce a hardening effect upon the lining, gilsonite to control the amount of friction in initiating braking action, and linseed oil serving to give increased body to the lining and to act as a binding medium to assist in retaining the other materials therein.

13. A method of making a friction fabric which comprises impregnating a fabric with a glaze-forming material and a glaze-destroying material so that as glazing action takes place in the use of the completed friction fabric the glaze-destroying action acts simultaneously therewith to maintain a substantially constant coefficient of friction.

14. A method of making a friction fabric which comprises impregnating the fabric with a tar material adapted to form a glaze when the fabric is employed as a frictioning element, incorporating in the said fabric a material adapted to break up the glaze into a dust, thereby producing glaze-destroying action to prevent glaze formation to the extent of producing slipping when the friction fabric is in use.

15. A method of making a friction fabric which comprises impregnating the fabric with a tar material adapted to form a glaze on the surface of the friction fabric when in use, and incorporating in the fabric a pitch material adapted to keep the glaze broken up into a dust, thereby producing glaze-destroying action to limit glaze formation and to maintain a substantially constant coefficient of friction.

16. A method of making a friction fabric which comprises impregnating said fabric with water gas tar and stearin pitch, operating respectively as glaze-forming and glaze-destroying agents to maintain a substantially constant coefficient of friction in the finished lining.

17. A method of making a friction fabric which comprises impregnating the fabric with water gas tar and stearin pitch to operate respectively as glaze-forming and glaze-destroying agents in the final fabric, and incorporating therewith a suitable amount of coal tar to control the amount of friction at the start-off during use of the friction fabric.

18. A method of making a friction fabric which comprises impregnating the fabric with a composition containing ingredients in the following ratios: water gas tar 48 parts by weight, stearin pitch 6 parts, and coal tar 8 parts.

19. A method of making a friction fabric which comprises impregnating the fabric with a tar material as a glaze-forming agent, a pitch material as a glaze-destroying agent, incorporating China-wood oil therein and thereafter polymerizing the China-wood oil to harden and give sufficient firmness to the lining.

20. A method of making a friction fabric which comprises impregnating the fabric with a tar material as a glaze-forming agent, a pitch material as a glaze-destroying agent, and incorporating therein gilsonite which in the presence of the other ingredients acts as a frictioning agent serving to increase the friction with high speeds.

21. A method of making a friction fabric which comprises impregnating the fabric with a tar material as a glaze-forming agent, a pitch material as a glaze-destroying agent, incorporating China-wood oil therein, polymerizing the China-wood oil to harden and give sufficient firmness to the lining, and thereafter incorporating therein gilsonite which in the presence of the other ingredients acts as a frictioning agent serving to increase the friction with high speeds.

22. A method of making a friction fabric which comprises impregnating the fabric with water gas tar to serve as a glaze-forming agent, stearin pitch to operate as a glaze-destroying agent, coal tar to control the amount of friction at the start-off during use of the fabric, China-wood oil to harden and give sufficient firmness to the lining, gilsonite which in the presence of the other ingredients acts as a frictioning agent serving to increase the friction with high speeds and drying the product to produce the friction fabric.

23. A method of making a friction fabric which comprises impregnating the fabric with a glaze-forming tar, incorporation therewith a pitch material serving during operation of the friction fabric to keep the glaze broken up into a dust and definitely limiting the glaze-forming action, incorporating a relatively small amount of China-wood oil therein to serve as a hardening medium, giving body to the lining, incorporating coal tar therein, serving at high temperatures to form a resinous gum acting to control the amount of friction at the start-off, and incorporating a sufficient amount of linseed oil therein to serve as a binding medium to evenly distribute the impregnating constituents through the lining and after impregnation has taken place drying the lining at an elevated temperature and calendering and pressing the fabric to size to form the finished product.

24. A method of making a friction fabric which comprises passing the fabric bent in one direction into a bath containing ingredients in the following proportions: water gas tar 48 parts, stearin pitch 6 parts, coal tar 8 parts, China-wood oil 1 part, linseed oil 2 parts, gilsonite 6 parts, cobalt drier 5% of the linseed and China-wood oil, and an amount of coal tar solvent about one-third by weight of the total mixture, reversing the twist in the fabric and passing the fabric into another bath of substantially the same composition with the fabric bent in the opposite direction to attain impregnation, then passing the material into a drying oven maintained at substantially 400° F. and thence passing the impregnated fabric to a calender to be pressed to size.

In testimony whereof I affix my signature.
WILLIAM NANFELDT.